United States Patent
Schultz et al.

(10) Patent No.: US 9,392,397 B2
(45) Date of Patent: Jul. 12, 2016

(54) RADIO MODULE, APPLICATION DEVICE AND METHOD FOR OPERATING AN APPLICATION DEVICE THAT EXCHANGES APPLICATION DATA VIA A CELLULAR RADIO COMMUNICATION NETWORK

(71) Applicant: GEMALTO M2M GMBH, München (DE)

(72) Inventors: Michael Schultz, Berlin (DE); Florian Denzin, Berlin (DE); Volker Breuer, Bötzow (DE); Frank Westerkowsky, Berlin (DE); Jörg Rook, Berlin (DE)

(73) Assignee: GEMALTO M2M GMBH, Munich (DE)

( * ) Notice: Subject to any disclaimer, the term of this patent is extended or adjusted under 35 U.S.C. 154(b) by 0 days.

(21) Appl. No.: 14/376,240

(22) PCT Filed: Feb. 4, 2013

(86) PCT No.: PCT/EP2013/052149
§ 371 (c)(1),
(2) Date: Aug. 1, 2014

(87) PCT Pub. No.: WO2013/113925
PCT Pub. Date: Aug. 8, 2013

(65) Prior Publication Data
US 2014/0378122 A1    Dec. 25, 2014

(30) Foreign Application Priority Data

Feb. 3, 2012 (EP) .................................... 12153940
Feb. 24, 2012 (EP) .................................... 12156962

(51) Int. Cl.
*H04M 3/00* (2006.01)
*H04W 4/00* (2009.01)
(Continued)

(52) U.S. Cl.
CPC .............. *H04W 4/005* (2013.01); *G08C 17/02* (2013.01); *H04W 4/001* (2013.01); *H04W 4/006* (2013.01);
(Continued)

(58) Field of Classification Search
CPC ................................ H04W 8/18; H04W 8/186
USPC ............................................. 455/420
See application file for complete search history.

(56) References Cited

U.S. PATENT DOCUMENTS

| | | | |
|---|---|---|---|
| 2009/0199268 A1* | 8/2009 | Ahmavaara | H04L 12/4633 726/1 |
| 2011/0199905 A1 | 8/2011 | Pinheiro et al. | |
| 2011/0274040 A1* | 11/2011 | Pani | H04W 4/005 370/328 |

FOREIGN PATENT DOCUMENTS

EP          2 400 734 A2    12/2011
WO   WO 2011/087826 A1    7/2011

OTHER PUBLICATIONS

International Search Report (PCT/ISA/210) mailed on Jun. 3, 2013, by the European Patent Office as the International Searching Authority for International Application No. PCT/EP2013/052149.
(Continued)

*Primary Examiner* — Thomas Lett
(74) *Attorney, Agent, or Firm* — Buchanan Ingersoll & Rooney PC

(57) ABSTRACT

An application device exchanges application data via a cellular radio communication network with an application server. The application device has a memory providing write access for a control entity associated with the network. The application device receives an information element from a network management node operated by the control entity. The information element is indicative of regulation information that defines at least one time span or point in time that can be used for transmission of application exchange data between the application device and the application server. The application device receives an instruction from the network management node to store the regulation information in the device memory, and stores the regulation information. The application device subsequently initiates transmission of the application exchange data between the application device and the application server only at an allowed time that is in accordance with the stored regulation information.

14 Claims, 2 Drawing Sheets

(51) Int. Cl.
*H04W 4/08* (2009.01)
*H04W 72/12* (2009.01)
*G08C 17/02* (2006.01)
*H04W 8/24* (2009.01)
*H04W 74/04* (2009.01)

(52) U.S. Cl.
CPC ............... *H04W 4/08* (2013.01); *H04W 8/245* (2013.01); *H04W 72/12* (2013.01); *H04W 74/04* (2013.01); *G08C 2201/21* (2013.01)

(56) References Cited

OTHER PUBLICATIONS

Written Opinion (PCT/ISA/237) mailed on Jun. 3, 2013, by the European Patent Office as the International Searching Authority for International Application No. PCT/EP2013/052149.

* cited by examiner

RADIO MODULE, APPLICATION DEVICE AND METHOD FOR OPERATING AN APPLICATION DEVICE THAT EXCHANGES APPLICATION DATA VIA A CELLULAR RADIO COMMUNICATION NETWORK

The present invention relates to an application device and a radio module, which is configured to initiate a transmission of application output data in communication with a radio access network in accordance with a predetermined application transmission information element. The invention is further related to a respective method of operating an application device and/or radio module. The invention further is with regard to a method for operating a cellular network management node and a cellular network management node. The invention also implies respective computer program products related to the methods of the present invention.

The invention is specifically advantageous in the field of machine-to-machine (M2M) communication. M2M communication is performed via communication networks of limited capacity, such as radio access networks. A first machine performs a specific application function and transmits application output data related to this application function to a second machine. This second machine processes the received application output data in order to perform other functions, which may for instance be control or monitoring of the first machine. Without loss of generalization, the present specification will refer to the specific application function of the first machine, and thus to the first machine itself; which hereinafter may also be denoted simply as an application device or application. The data for exchange, i.e. upload and/or download transmission, by the application will be referred to as application data or application exchange data. The second machine will hereinafter also be referred to as an application server, without implying performance of other functions than receiving and processing the application exchange data.

An example of an application is an electrical meter that measures a consumption of energy in a consumer household. For enabling M2M communication, such an electrical meter may comprise a radio module for the transmission of the measured energy consumption data to an application server of a central system of an energy provider. In the art, this type of advanced metering infrastructure is often referred to as a "smart meter". Smart meters may not only provide one type of application output data such as the mentioned example of energy consumption. Other types of application output data of a smart meter may comprise information on a status of the meter device, e.g. on a power outage, or other state information regarding the monitored physical quantity. Currently, the number of installed smart meters is low enough to be accommodated by the capacity of existing radio access network infrastructure. However, with an expected increase in the number of M2M applications that use communication via radio access networks, the transmission capacity provided by the radio access networks may become increasingly used by M2M devices, thus increasing the chances of insufficient capacity or decrease in quality of service delivered for transmissions other than M2M, such as speech and Internet traffic. For instance, mobile telephone users may not be able to access a radio access network in moments of peak usage by M2M applications. In summary, congestion is expected to become a major problem as the number of smart metering devices using data communication via radio access networks increases.

Contemporary rapid developments of machine applications make use of mobile communication for up- or download transmission of application data between an application device and an application server via a mobile network. This in particular holds true for said M2M applications which are considered to comprise an operative first machine and a supervising second machine which are wireless connected via a radio module for communication over a mobile network. A mobile network can be a GSM, GPRS, UMTS or LTE based radio network which usually is constituted by means of several network nodes for transmitting data of radio modules, which can wirelessly be connected to the nodes in a communication link. Usually the capacity of the network nodes is adapted according to a certain number of radio modules connectable in a so called network cell. For instance, in rural areas a network cell can have a rather large area due to the rather low number of radio modules in the rural area. However, in conurbation areas a network cell is to be limited due to the large number and density of radio modules and the limited available capacity of a network node. Whereas usual mobile network assisted communication comprises speech- and multimedia-communication in a transmission of in persona subscribers meanwhile the vast development of machine based so called M2M applications cause an additional data load in a network cell in addition to the transmission load of in persona subscribers. Thus, a data transmission congestion cannot be excluded, in particular a data congestion is considered to be stringent due to certain standard use of data transmission of M2M applications. The reason is as follows.

Machine and other machine based wireless communication applications usually work in an autonomous way according to certain rules for data transmission of a radio module of an application device in a communication link to a mobile network. For instance a radio module of an application device, which is in a communication link to an external application server will attempt to exchange application exchange data between the application device and the application server as soon as the application data are available, thus immediately. In a relaxed mode a radio module of an application device will be triggered to send application exchange data at certain times which are prescribed in an autonomous way either by a mobile application itself or by an application server. For instance, a mobile M2M application may receive triggering point of times or cycles of times for data transmission from an application server or another central supervising unit of an M2M application. Thus, in any case a time for application data exchange usually is caused by internal criteria of the application alone. Such triggering point of times or time cycles may be motivated by cost rates of a mobile network provider, which however essentially result in an uncoordinated sequence of time for data exchange of an M2M application via a mobile network. Given a saturated data load on a node of a network cell due to congestion the above mentioned uncoordinated sequence of time for data exchange for M2M applications may result in a uncoordinated congestion, delay or even loss of data. However, it is not only uncomfortable for all mobile subscribers in persona but also may cause severe problems in an M2M application, e.g. due to a broken transmission or even loss of application exchange data. This may cause a security problem or endanger hazardous situations.

While in the prior art a fixed time schedule for application data exchange may be selected in a more or less intelligent way, nevertheless the above mentioned problem cannot be avoided in unforeseen situations. Unforeseen situations for instance may occur during a peak data load in conurbation areas; e.g. due to usual dynamic fluctuation of mobile network subscribers in persona, but most importantly due to machine applications. The former peak load for instance may arise when a popular event with a mammoth number of subscribers in persona may collide for instance with a point of time for peak application data exchange. A known critical point of time is for instance the daydate change time at midnight. Usually the in persona subscribers' mobile communication data are of higher priority whereas nevertheless a spoiled or lost application data exchange may cause hazardous situations. The only solution to this problem seems to be, to extend a net capacity for data exchange or change the points of time for exchange of application data. The effect of such measure, however, will nevertheless also suffer from a saturation as soon further vast developed M2M applications participate to the communication load.

Desirable is a net capacity which can be used in a more flexible way, in particular without the need to provide maximum net capacities for peak data loads. Desirable is to reduce congestion problems caused by a machine based data exchange in a mobile network.

This is where the invention comes in, the object of which is to specify in general a device and a method which is adapted for an improved exchange of application data via a cellular radio communication network between an application device and an external application server operated by an application provider. In particular, it is an object of the invention to provide a device and method for improved exchange of application data via the cellular radio communication network which is more flexible in view of an actual data load in a mobile network to thereby reduce congestion problems; in particular the solution shall be flexible and easy to handle. In particular, the device and method shall be adapted for implementation in contemporary mobile network structures like for instance data communication in a GSM, GPRS, UMTS or LTE based mobile network or the like.

As regards the method, the object is achieved by a method for operating an application device that exchanges application data via a cellular radio communication network with an external application sever operated by an application provider as claimed in instant claim 1.

As regards the device, the object is achieved by a radio module for wireless communication of data within a cellular radio communication network as claimed in instant claim 12.

As regards the device, the object is also achieved by an application device for generating and exchanging application exchange data via a cellular radio communication network with an external application server operated by an application provider as claimed in instant claim 16.

As regards the method, the object is also achieved by a method for operating a cellular network management node in a cellular radio communication network as claimed in instant claim 19.

As regards the device, the object is also achieved by a cellular network management node of a cellular radio communication network as claimed in instant claim 22.

The instant invention starts from the consideration that usual M2M application communication is based on an application device and an application server which are adapted for exchange of application data via a cellular radio communication network. The application device in particular comprises an application module, a radio module connected with the application module and a device memory providing write access for only a control entity associated with the cellular radio communication network. It should be noted that a device memory of contemporary kind usually is provided in a subscriber identification module for contacting a radio module in the application device. Such subscriber identification module of contemporary kind is provided as a subscriber identification module card (SIM card) for instance. However, the concept of the instant invention also embraces a device memory providing write access for only a control entity associated with a cellular radio communication network, which can be formed as a memory of the application device, in particular for instance can be formed as a memory of the radio module itself and/or as a memory of an application module. Basically, the instant invention starts from the consideration that existing mechanisms of configuration of such device memory providing write access for only a control entity associated with a cellular radio communication network allow a network provider to prescribe a preferred time schedule for data exchange with the mobile network.

Thus, the invention recognized that indeed existing mechanisms to read and write to the mentioned device memory providing write access for only a control entity associated with a cellular radio communication network up to now have not been used to solve the object of this invention; namely to provide a information element being indicative of regulation information. The regulation information are in particular adapted such that an actually updated regulation of a transmission is possible for avoiding or at least relaxing congestion. The inventive regulation information thus dynamically and flexibly can support an improved time schedule for data exchange of the radio module to the mobile network.

Preferably the basic concept of the invention takes advantage from the possibility to identify each individual radio module by means of the SIM for instance. Thus, the invention recognizes the additional synergetic advantages from providing the information element on the device memory apart from being able to use secure existing mechanisms of reading and writing the mentioned device memory. Receiving the regulation information can use existing methods for writing to the device memory. For instance SMS or Bearer Independent Protocol methods (BIP) are known to update data on a SIM or other kind of device memories. A radio module, for instance a GSM, GPRS or UMTS module is able to recognize such data and will be able to use this data for communication with an application. Communication to the application can be provided by means of any known AT command or URC code.

Thus, according to a first inventive aspect of the invention, the radio module is configured to receive a information element from a cellular network management node operated by a control entity associated with the cellular radio communication network to extract from the information element regulation information which is adapted to define at least one time span or point in time defined in terms of a week, a day or a time of day that can be used for up- or download transmission of application exchange data between the application device and the application server via the cellular radio communication network. In particular a scheme can be provided to a device memory, in particular in a SIM, within a standardized data file or the like on the device memory. The information element preferably comprises a scheme or the like, in particular wherein the scheme lists data suitable for actually updating allowed transmission times of a time span and/or point in time. In particular the scheme comprises scheduling information, in particular wherein the scheduling information list actually updated allowed transmission times of a time span and/or point in time. In particular additionally or alternatively the scheme comprises tariff information associated with the information element, in particular wherein the tariff information assign a transmission cost-rate to a time span and/or point in time.

Leading to a second inventive aspect the invention recognized that up to now a coupling of a bidirectional communication path "radio module to network" and the bidirectional upload or download transmission path "radio module to application server" has not been used to ease a solution of the congestion problem. Up to now, a mobile network organization is only able to affect a radio module as such and an information item has not been made available to an application, in particular is lost for an application device. Thus, the basic concept of the second aspect of the invention is to provide a coupling of a communication path between a mobile network organization and a device memory on the one hand as well as a communication path between the device memory and the M2M application on the other hand. Thus, according to a second aspect of the invention the application device, in particular a radio module, is configured to receive an instruction from the cellular network management node to initiate a storage of the regulation information comprised in the information element in a device memory providing write access for only a control entity associated with the cellular radio communication network and being connectable or connected to radio module and to initiate storing of the regulation information correspondingly.

Developed configurations of the invention are further outlined in the dependent claims. Thereby the mentioned advantages of the proposed concept are even more improved.

The method and developed configurations thereof as outlined above may be implemented by digital circuits of any preferred kind, whereby the advantages associated with the digital circuits may be obtained. In particular, one or more method steps and/or features of the method can be implemented by one or means for functionally executing the method step. A single processor or other unit may fulfill the functions of several means recited in the claims—this in particular holds for user equipment according to the concept of the invention. In particular the application scheduling unit may be provided as a hardware unit with dedicated circuitry. In another embodiment, it is implemented by means of a programmable microprocessor and a corresponding executable software unit. The application scheduling unit may be for instance provided as a functional unit of an operating system that is installed on the radio device for control of its operation. In another embodiment, the application scheduling unit is a software unit that is separate from the operating system and installable on top of the operating system as a part of an application layer functionality of the radio device. As already apparent from the discussion above, the allowed time may in different embodiments depend on either one or at least two different parameters and may be provided by an application provider.

As mentioned before, the radio device of the present invention may be used in the hardware context of an application device. In particular, it may form an integral part of the application device, for instance in the form of a radio module that is connected with an application module. Generally, thus, preferred embodiments of the radio device further comprise an application unit, which is connected with the application scheduling unit and which is configured to generate the application output data. Examples of application units are abundant, and comprise, generally speaking, metering devices for measuring a physical quantity and/or transformer devices for transforming all kinds of signals or data.

According to a preferred development of the second aspect of the invention further, the application device, in particular the radio module, is configured to forward the regulation information to an external application module that is connectable to the application device, in particular radio module, and/or to forward the regulation information to the application server.

In a particular preferred development, alternatively or additionally, the application module has access means to read data from the device memory. This can be achieved by holding the device memory in the application module. This can also be achieved by additionally or alternatively providing direct access means through the radio module. E.g. an interface layer like the so-called SIM application toolkit (SAT) can establish such direct access means.

Advantageously it is no more necessary that an application device asks a server or other central unit for data exchange or whether data exchange is affordable within a certain fixed time schedule. According to the concept of the invention the information element which is adapted to define at least one time span or point in time defined in terms of a week, a day or a time of day can be used for an up- or download transmission of application exchange data between the application device and the application server and as the information element is available in the application module and/or the application server and a data exchange of application data can be initiated at the application entities' own discretion.

Thus, in a particular preferred example for instance traffic data are available to an application entity itself actually and thus an application entity can be adapted to decide—e.g. in view of the priority of application data and/or in view of a data load and/or other conditions—whether a transmission of application data is affordable or not in view of a congestion situation.

Generally the stored data comprise information that control the date and time of a transmission. Certain options and combinations can be hold in such information. Upon transmission of a schedule and/or a tariff related information the device has the capability to decide if a transmission at a certain tariff is appropriate. This can be accomplished in various options for a format; some of which are listed in the following.

Requests or schedules can consist either of simple definitions to send or not to send now or at a certain time. Further priority levels can be created like 1–n. When transmission data a certain priority value is assigned it can be decided if the transmission is to execute or not.

For tariff related situations the information can consist either of detailed tariff data, in particular a cost-rate value like EUR per MB, or a factor related to the normal tariff, like in nighttimes a factor below 1 of the normal price favors these times. With that it is easier to configure the device to assign those factors to data which are to be transmitted. E.g. movie data or software updates get therefore typically assigned a low factor value, while time critical data get a high factor.

Combinations of schedule or tariff related information are possible. E.g. certain allowed time spans and disallowed timespans are related within in a schedule. For the allowed time spans tariff data are available which give the device the chance to decide at what time within this time span a transmission is preferable. Such it can be controlled in particular by network operators that certain time areas are free of such type of data transactions, but at the moment the allowed time span starts not all automatically started transmissions at the same time, but those transmissions are distributed over the time span according to different priorities and ability to pay the tariffs.

Thus in summary the application device of the present developments further is distinguished from known application devices by its application scheduling element stored in a device memory providing write access for only a control entity associated with a cellular radio communication network.

An application scheduling unit can control the initiation of transmissions of application exchange data in communication with a radio access network. The application scheduling unit can operate on the basis of a predetermined application transmission schedule, which is managed locally within the radio and/or application device. The application transmission schedule applies to application exchange data that, in operation of the radio device, are provided by an application unit. However, for clarification it is noted that the radio device is in some embodiments provided without an application unit, but with the application scheduling unit. For instance, an application unit may be formed by a meter to be connected with the radio device. The radio device may in this case be delivered to a manufacturer of the meter, which combines the meter and the radio device to form an application device. Providing the scheduling element is based on the recognition that M2M communication, in many application scenarios, is less time critical and may be distributed in time.

Several possibilities exist for storing the information that is required to implement the operation under the application transmission schedule. The radio device itself in one embodiment further comprises a memory for storing the parameter value of the at least one parameter allocated to the radio device, or the schedule-calculation rule, or both. The memory may in different embodiments be a part of a subscriber identity module present in the radio device. Herein, the term subscriber identity module is used without restriction to a particular standard of mobile telecommunication. By way of example, it is meant to comprise implementations as a USIM for 3G radio communication, a solderable SIM, a software implemented SIM, or any other identification module that can be used for user identification and authentication purposes and is preferably access protected. In other embodiments, the memory for storing the parameter value is arranged in another part of the radio device, such as a part of a chipset or as an integrated part of a system on chip (SoC) or of a system in package (SiP). The memory may also be arranged outside the radio device in an application unit.

Communication of application output data is in many embodiments performed from a radio device. However, the invention also concerns embodiment, in which the communication of application output data is alternatively or additionally performed to the radio device. As an example of communication of application output data to the radio device, the radio device may be configured to check, in accordance with the application transmission schedule, with assigned remote servers for an update of certain data, such as a firmware, or an update on schedule-calculation rules or smartphones, tablets or eBook readers which are configured to download e.g. game, movie or newspaper data during low traffic times. Embodiments of the radio device thus additionally comprise a receiving unit, which is configured to receive radio signals in communication with the radio access network.

The receiving unit of these embodiments is preferably additionally configured to receive the schedule-calculation rule and forward it internally for storing it inside the radio device. This embodiment has the advantage of allowing an adaptation of the schedule-calculation rule on the network or application server side. It is considered useful to provide a number of schedule-calculation rules initially to the radio device and to later provide selection signals that instruct the radio device to select a specific schedule-calculation rule from the set of rules stored.

Preferably the radio module receives the information element from the cellular network management node as a text message via a short message service provided by the cellular radio communication network. Advantageously the radio module of the application device receives the information element via a management-channel communication between the cellular network management node and the subscriber identification module. These developments can be achieved within existing structures of mobile communication. Further the radio module preferably forwards the regulation information to the application module using an AT command or an Unsolicited Result Code (URC) command.

In a particular preferred development in the application device, the radio module is connected with an application module and wherein the device memory is a memory of the radio module and/or a subscriber identification module and/or of the application module.

Preferably the radio module is adapted for receiving the information element from a cellular network management node operated by the control entity. Preferably also the radio module is adapted for receiving an instruction from the cellular network management node to store regulation information comprised in the information element in the device memory and storing the regulation information correspondingly. Particular preferred the radio module is adapted for forwarding the regulation information to the application module and/or the application server.

In particular the radio module is adapted for executing subsequently the steps of: receiving the information element, receiving the instruction to store regulation information. Preferably application exchange data are generated to be up- or download transmitted between the application device and the application server.

In particular the radio module is adapted to forward the regulation information to an external application module that is connectable to the radio module and/or to forward the regulation information to the application server. In particular for these developments the method comprises the step of: the application module is subsequently initiating a up- or download transmission of the application exchange data between the application device and the application server via the radio module only at the at least one allowed time that is in accordance with the regulation information stored in the device memory.

In a preferred development the information element is additionally indicative of tariff information associated with the regulation information. Advantageously in a cellular network management node a subscriber group management unit can be configured to store and maintain a subscriber group database that assigns respective group identifiers to different sets of application devices subscribed to the cellular communication network. Preferably this allows to configure the traffic scheduling unit to generate different information elements comprising different regulation information for application devices assigned to different group identifiers. E.g. different group identifier may be assigned to different priorities of transmission. This has the advantage that an impact of congestion situation can be reduced up to the demands and particulars of a certain group. In a further preferred development it is advantageous that different regulation information are generated for an up- or download transmission respectively.

For a more complete understanding of the invention, the invention will now be described in detail with reference to the accompanying drawings. The detailed description will illustrate and describe what is considered as preferred embodiment of the invention. It should be of course be understood that whereas modifications and changes in form or detail could readily be made without departing from the spirit of the invention. It is therefore intended that the invention may not be limited to the exact form and detail shown and described herein nor to anything less than the whole of the invention disclosed herein and as claimed hereinafter. Further, the features described in the description, the drawing and the claims disclosing the invention may be essential for the invention considered alone or in combination. In particular, any reference signs in the claims shall not be construed as limiting the scope of the invention. The wording "comprising" does not exclude other elements or steps. The wording "are" or "an" does not exclude a plurality.

IN THE DRAWING

Figure 1:
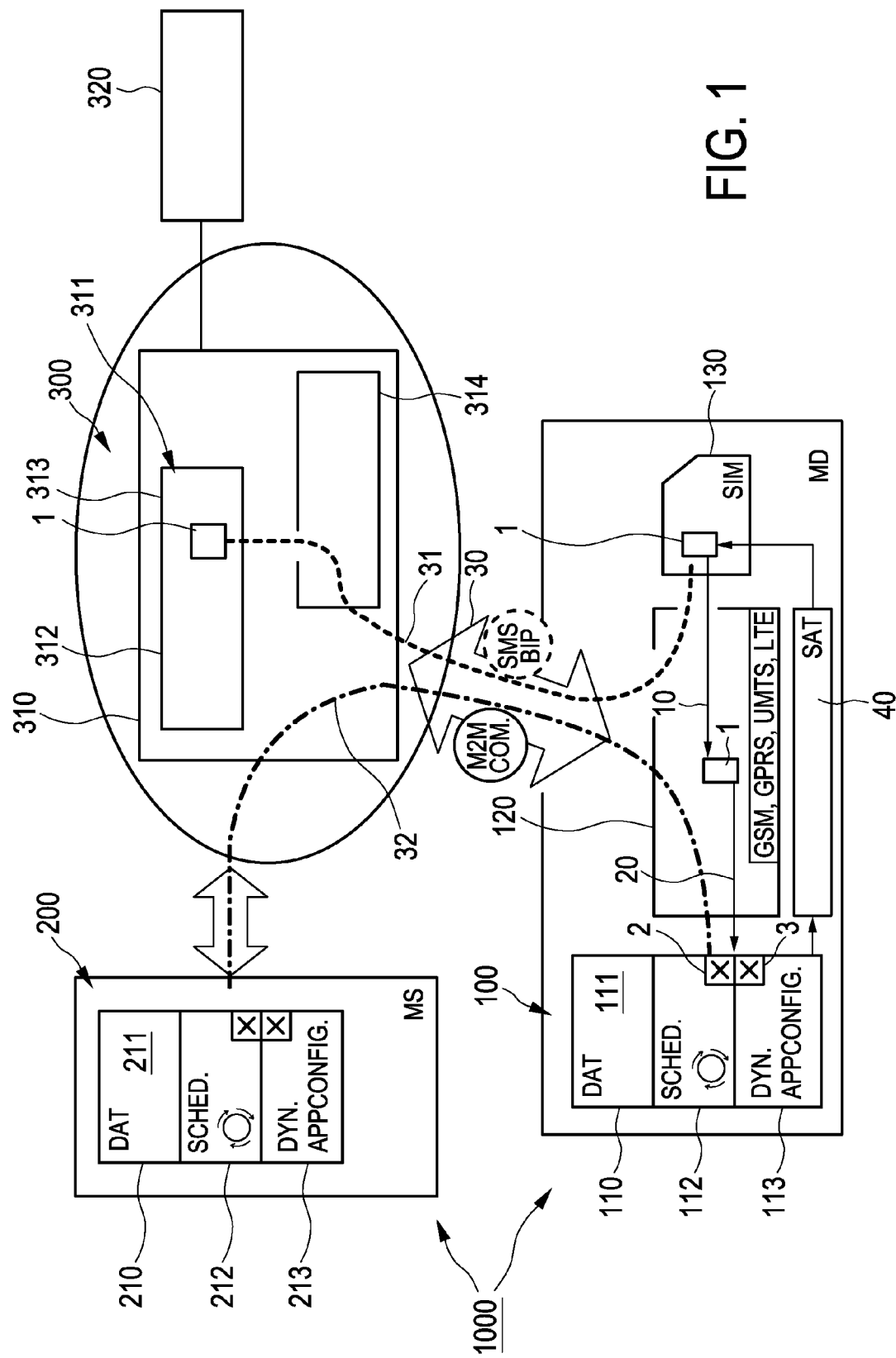
FIG. 1 shows a basic scheme of a system of an M2M application comprising an application device and an application server which are adapted for communication via a mobile network.

FIG. 1 depicts schematically a system 1000 of an M2M application for communication over a mobile network 300. The M2M application as such is provided as a system 1000 of an application device 100 and an application server 200. The application device 100 comprises an application module 110, a radio module 120 connected with the application module 110 and a subscriber identification module (SIM) 130, here in form of a card. Further connections of the application device 100 are of course possible in accordance with the technical requirements i.a. of the radio module 120. The radio module 120 e.g. comprises a communication unit comprising transmission unit and a receiver unit for exchanging radio signals with a radio access mobile networks 300 infrastructure in accordance with a known radio telecommunication standard. By way of example, the transmission and receiver units are not shown in detail but may operate as known in the art in accordance with a GSM, UMTS, and/or LTE standard, without excluding compatibility with any other standard of radio telecommunication used anywhere in the world. The transmission and receiver units may for instance be implemented in the form of a radio module, that is, a hardware unit that implements all baseband and RF functionalities required for communicating with a radio access network.

As will be explained further down an application scheduling unit is provided on a separate piece of hardware, which comprises the application module 110. The application module 110 may be any type of signal or data processing device that generates application output data which are to be transmitted to an external application server 200 via the radio module 120.

The application server 200 has a server module 210 and other components of a computer device which are not depicted in detail for M2M communication with the application module 110 via the radio module 120.

The mobile network 300 has a cellular network management node 310 which in the instant embodiment is connected to an external resource management unit 320. The cellular network management node 310 has several subunits, two of which are depicted in FIG. 1. One is a traffic scheduling unit 311 which has two entities; one of which is a schedule entity 312 for individual traffic shaping and the other one is a interface entity 313 adapted as an interface for a configuration of machine applications. The mobile application dynamic configuration information may be gathered by an interface in unit 313 and thus may use mobile network internal data as well as data of a resource management 320. Further, the cellular network management node 310 comprises a network management unit 314 which among others is adapted for subscriber management.

In the application server 200 the server module 210 and in the application device 100 the application module 110 are depicted as a frame for stored application exchange data 111, 211, which of course may comprise among a storage means further logic and computer means for data handling storage and management and data communication like for instance a bus system or suitable interfaces.

Also both—the server module 210 and the application module 110—have respectively an application scheduling unit 112, 212 for scheduling a traffic of communication and a application configuration unit 113, 213 for dynamically configuring the mobile application, i.e. the M2M application system 1000.

In the application device 100 a physical data connection is provided between the application module 110, the radio module 120 and the subscriber identification module 130 wherein bidirectional data exchange is possible via a data bus for instance using an AT command or an unsolicited result code URC command. Respective data interfaces and data lines are depicted between the subscriber identification module 130 and the radio module 120 as a first bidirectional data connection 10 and between the radio module 120 and application module 110 as a second bidirectional data connection 20. In the instant case the arrows on the connections 10, 20 indicate forward push of an information element 1 which in this case is a information element 1 from the SIM 130 to the radio module 120 and further to the application module 110. In the instant case also direct access means from the application module 110 through the radio module 120 to the subscriber identification module 130 is provided by means of a an interface layer 40 like the so-called SIM application toolkit (SAT).

The information element 1 comprises two items of information; namely first a regular traffic regulation information 2 and second application dynamic configuration information 3. The regular traffic regulation information 2 is forwarded to the application scheduling unit 112, 212 for scheduling traffic of communication. The application dynamic configuration information 3 is forwarded to the application configuration unit 113, 213 for dynamically configuring the mobile application. The regulation information associated with the information element 1 comprise scheduling information and tariff information. The scheduling information here list actually updated allowed transmission times of a time span and/or point in time.

The tariff information here assign a transmission cost-rate to a time span and/or point in time.

Wireless communication of data between the radio module 120 of the application device 100 with the cellular radio communication network 300 is indicated by a wireless bidirectional radio link 30. The radio link 30 in the instant case has a downlink path 31 which in this case is adapted for subscriber configuration via SMS or bearer independent protocol BIP. This method of subscriber configuration is an existing method for subscriber administration usually performed by the cellular network management node 310 by means of the network management unit 314 as a control entity for subscriber management. The network management unit 314, which usually can be entitled as a network operator or the like has read/write access to the subscriber identification module 130 for instance by means of updating data in the SIM or approving subscriber identity upon roaming or the like services in a mobile network.

In the instant case the network management unit 314 is used as a gate for delivering information element 1 in a downlink connection of said downlink path 31 to forward the information element 1 from the traffic scheduling unit 311. In the instant case the information element 1 comprises regulation information supported by an external resource management 320 through the interface entity 313 for application configuration to an individual traffic shaping entity 312. Thus, the information element 1 not only carries subscriber information, however, can be dedicated to a specific subscriber by means of the network management unit 314, namely for instance by means of an IMEI or IMSI number or the like. The regulation information in the information element 1 does not only comprise individual traffic shaping or regulation information 2 but also provide application dynamic configuration information 3. Thus, both kind of information 2, 3—a static or dynamic traffic regulation information 2 and the dynamic application configuration information 3—is generated in the traffic scheduling unit 311. The information element with the information 2 and 3 is transmitted through the downlink path 31 to the application device 100 as described above.

In an uplink path 32 the same information element 1—however at least the traffic regulation information 2 and the mobile application dynamic configuration information 3—is made available to the server module 210 in the application server 200. Thereby an end-to-end wireless uplink communication path 32 is provided between the application device 100 and the application server 200 to establish an end-to-end M2M application communication.

Figure 2:
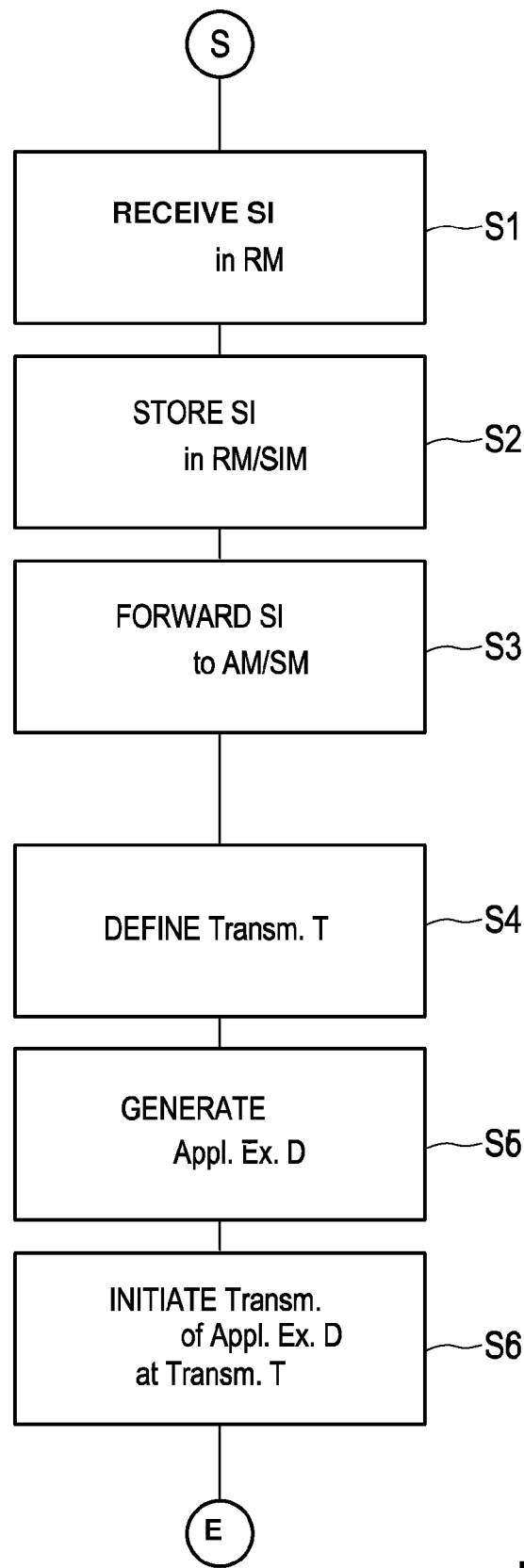
FIG. 2 is a flow chart for a preferred embodiment of a method for operating an application device as shown in FIG. 1 wherein the application device comprises an application module, a radio module and a device memory in a subscriber identification module of the application device connected to the radio module.

As shown in detail in FIG. 2, the system 1000 of FIG. 1 is adapted such that an application device 100 can receive a regulation information by means of the mobile application dynamic configuration information 3 which is adapted to define at least one time span or point in time defined in terms of a week, a day or a time of day that can be used for a up- or download transmission of application exchange data between the application device 100 and the application server 200. In step S1 of the method the regulation information SI is received in the radio module 120 by means of the information element 1. In step S2 said regulation information is stored in the SIM 130 by storing the information element 1. Here, existing methods for updating a SIM or administrating a subscriber can be used for instance using SMS or bearer independent protocol BIP in the downlink path 31. Of course also, the information element 1 can be used to store the regulation information, in particular the mobile application dynamic configuration information 3, in the radio module 120 and/or the application module 110; in the latter by means of application scheduling unit 112 for scheduling a traffic of communication and/or the application configuration unit 113, 213 for dynamically configuring the mobile application.

In step S3 the dynamic configuration information 3 is forwarded to the application module 110 by means of data connections 10 and 20 and thus is available for the discretion of the application device 100. In step S4 for instance using logic and calculation means of the application module 110 a transmission time can be defined for the transmission of application data from the application module 110 to a server module 210.

The application transmission schedule may be stored in different ways. In one example, the application transmission schedule is organized as a list of allowed times. The allowed times may define a calendar week, a calendar day or at least one time of day, depending on the requirements of the specific application implemented. Some applications may require a transmission of application exchange data 111, 211 at a rather low rate in terms of weeks only, while others may require much more frequent transmissions of application output data, for instance on an hourly basis.

It is noted that the generation of application exchange data may be performed independently and in parallel to the scheduling and transmission operations. The application module 110 and/or server module 210 is adapted to generate application exchange data 111, 211 to be up- or download transmitted between the application device 100 and the application server 200 without immediate transmission. In particular, by generating the application exchange data 111, 211 the usual transmission time prescribed by a traffic regulation information 2 can be suppressed due to a better information of the mobile application dynamic configuration information 3. Thus, as follow up of step S5, the application exchange data 111, 211 are generated, however, transmission thereof is retarded. In step S6 the transmission of application exchange data 111, 211 is initiated at a later better point of time, namely at a transmission time which is defined in terms of a week, a day or a time of day that can be preferably be used for up- or download transmission of the application exchange data 111, 211 without congestion problems. Thus, a colliding traffic load in the bidirectional data connection 30 and/or a congestion is avoided due to overriding the traffic regulation information 2 but following the instructions of the mobile application dynamic configuration information 3. In reality the data load congestion is relaxed and at least M2M exchange data 211, 111 of lower or lower most priority can be send in course of the application dynamic configuration information 3 at a time span or point in time defined in terms of a week, a day or a time of day which faces less traffic load than the original point of time of the traffic regulation information 2.

The invention claimed is:

1. A method for operating an application device that exchanges application data via a cellular radio communication network with an external application server operated by an application provider, the application device comprising an application processing device, a device memory providing write access for only a control entity associated with a cellular radio communication network, and a wireless communication terminal connected with the application processing device wherein the method comprises:
   the wireless communication terminal receiving an information element from a cellular network management node operated by the control entity, the information element being indicative of regulation information, which defines at least one time span or point in time defined in terms of a week, a day or a time of day, that can be used for an up- or download transmission of application exchange data between the application device and the application server;
   the wireless communication terminal receiving an instruction to store the regulation information comprised in the information element in the device memory and storing the regulation information correspondingly, wherein the wireless communication terminal of the application device receives the information element via a management-channel communication between the cellular network management node and the device memory; and
   the wireless communication terminal subsequently initiating a up- or download transmission of the application exchange data between the application device and the application server only at the at least one allowed time that is in accordance with the regulation information stored in the device memory.

2. The method of claim 1, wherein the device memory is a memory of the wireless communication terminal and/or a subscriber identity module and/or of the application processing device, wherein:
   the wireless communication terminal forwards the regulation information to the application processing device and/or the application server.

3. The method of claim 1, wherein the regulation information comprises tariff information associated with the information element.

4. The method of claim 3, wherein the tariff information assigns a transmission cost-rate to a time span and/or point in time.

5. The method of claim 1, wherein for an upload transmission, a first transmission regulation information is provided, and for a download transmission, a second transmission regulation information is provided, and wherein the first and second transmission regulation information are different.

6. The method as claimed in claim 1, wherein an interface layer is provided as a direct access means from the application processing device through the wireless communication terminal to a subscriber identity module.

7. A wireless communication terminal for wireless communication of data within a cellular radio communication network, the wireless communication terminal being configured:
to receive an information element from a cellular network management node operated by a control entity associated with the cellular radio communication network,
to extract, from the information element, regulation information that defines at least one time span or point in time defined in terms of a week, a day or a time of day, that can be used for an up- or download transmission of application exchange data between the application device and the application server via the cellular radio communication network;
to receive an instruction from the cellular network management node to initiate storage of the regulation information comprised in the information element in a device memory providing write access for only a control entity associated with a cellular radio communication network, and
to initiate storing of the regulation information correspondingly,
wherein the device memory is a memory of the wireless communication terminal and/or subscriber identity module and/or of an application processing device connected to the wireless communication terminal.

8. The wireless communication terminal of claim 7, which is configured to additionally extract, from the information element, tariff information associated with the regulation information.

9. The wireless communication terminal of claim 7, which is configured to receive the information element via a management channel communication between the cellular network management node and the subscriber identity module.

10. An application device for generating and exchanging application exchange data via a cellular radio communication network with an external application server operated by an application provider, the application device comprising:
a wireless communication terminal, and an application processing device which is connected with the wireless communication terminal, wherein
the wireless communication terminal is configured to communicate with the application server via at least one cellular network node operated by a control entity of a cellular radio communication network, and
the application processing device is configured to initiate an up- or download transmission of the application data between the application device and the application server and/or the cellular communication network only at a time that is in accordance with a regulation information stored in memory of the application device.

11. A method for operating a cellular network management node in a cellular radio communication network, wherein the method comprises:
the cellular network management node generating at least one information element indicative of regulation information, which defines at least one time span or point in time defined in terms of a week, a day or a time of day, that can be used for an up- or download transmission of application exchange data between an application device subscribed to an application server and the application server, which is associated with an application provider, via the cellular radio communication network;
the cellular network management node initiating an up- or download transmission of the information element between the application device and the application server along with an instruction to the at least one application device to store regulation information comprised in the information element in a device memory providing write access for only a control entity associated with the cellular radio communication network to the memory, wherein the device memory is a memory of a wireless communication terminal and/or a subscriber identity module and/or of an application processing device of the application device.

12. The method of claim 11, further comprising:
the cellular network management node maintaining a subscriber group database that assigns respective group identifiers to different sets of application devices subscribed to the cellular communication network, and
the cellular network management node generating different information elements comprising different regulation information for application devices assigned to different group identifiers.

13. A cellular network management node of a cellular radio communication network, comprising:
a traffic scheduler configured to generate at least one information element, the information element being indicative of regulation information, which defines at least one time span or point in time defined in terms of a week, a day or a time of day, that can be used for an up- or download transmission of application exchange data between an application device subscribed to the cellular radio communication network and the application server, which is assigned to an application provider, via the cellular radio communication network;
a network manager, which is configured to send the information element to the at least one application device along with an instruction to store the regulation information in a device memory providing write access for only a control entity associated with a cellular radio communication network, in particular wherein the device memory is a memory of a wireless communication terminal and/or a subscriber identity module and/or of an application processing device of the application device.

14. The cellular network management node of claim 13, further comprising a subscriber group manager, which is configured to store and maintain a subscriber group database that assigns respective group identifiers to different sets of application devices subscribed to the cellular communication network, wherein the traffic scheduler is configured to generate different information elements comprising different regulation information for application devices assigned to different group identifiers.

* * * * *